Oct. 28, 1941. A. L. WALLACE 2,260,354
GAUGE FOR ELONGATED BODIES
Filed Dec. 17, 1938 3 Sheets-Sheet 1

INVENTOR.
A. L. Wallace
BY Thomas Howe
ATTORNEY

Oct. 28, 1941.    A. L. WALLACE    2,260,354
GAUGE FOR ELONGATED BODIES
Filed Dec. 17, 1938    3 Sheets-Sheet 2
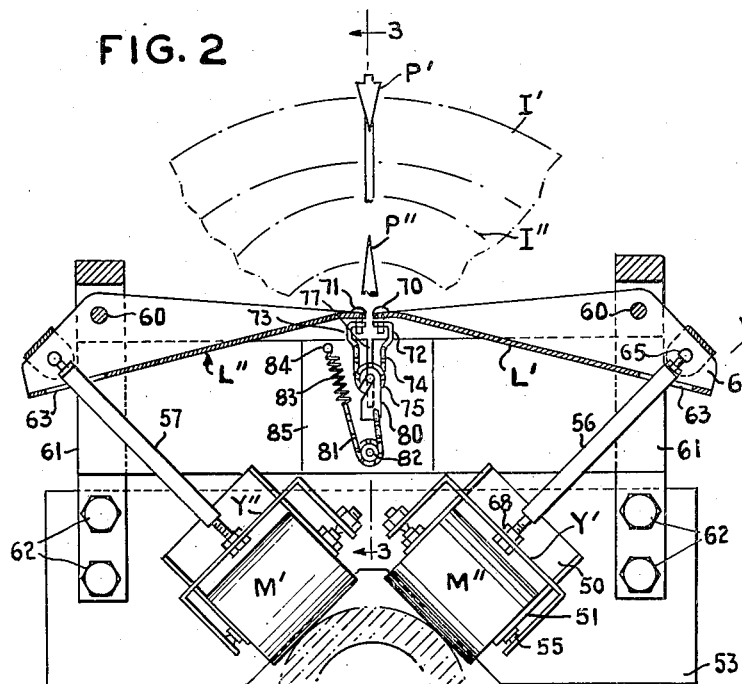
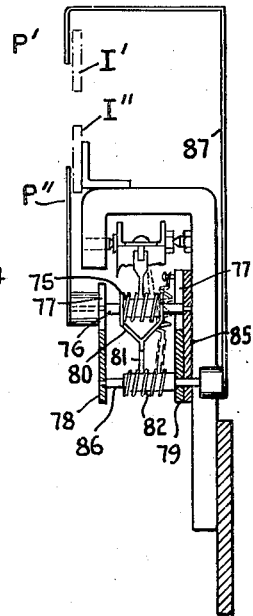
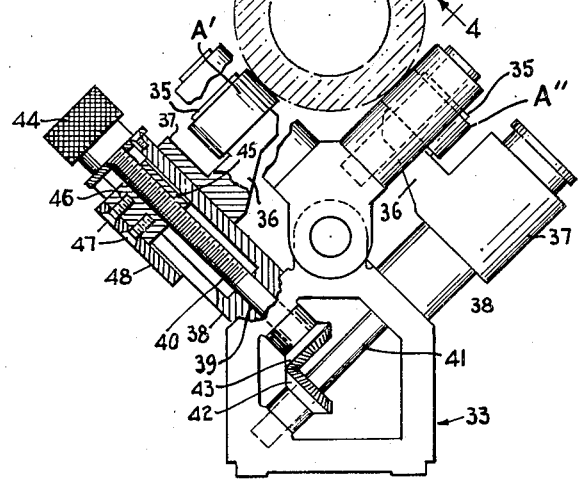
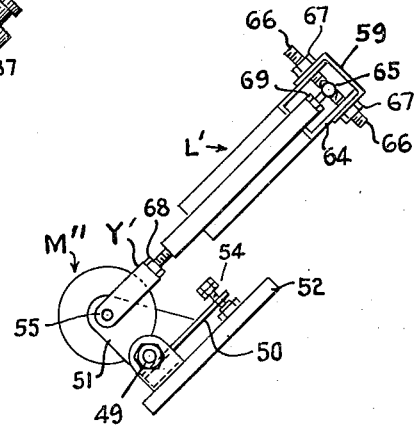
A. L. Wallace  INVENTOR.
BY  Thomas Howe  ATTORNEY.

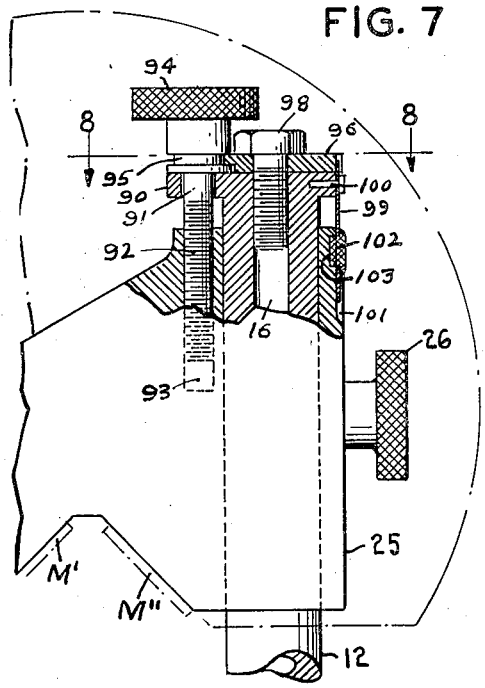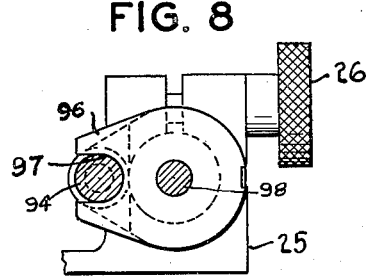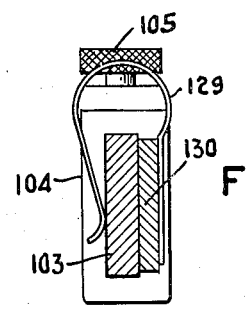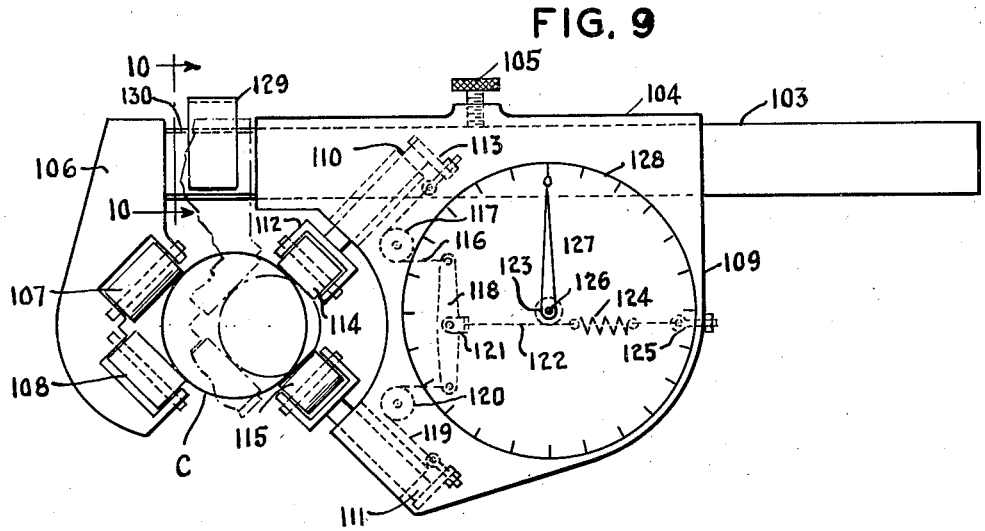

Patented Oct. 28, 1941

2,260,354

UNITED STATES PATENT OFFICE 2,260,354

GAUGE FOR ELONGATED BODIES

Archibald L. Wallace, Northport, N. Y., assignor, by mesne assignments, of one-half to Archibald L. Wallace and one-half to Cherryfield Corporation, a corporation of Delaware Application December 17, 1938, Serial No. 246,380

23 Claims. (Cl. 33—178)

This invention relates to gauging mechanism, especially to means for indicating different diameters of such cylindrical structures as rubber sheathed conduits, and more particularly to the determination and indication of such differences in diameter as are encountered in the fabrication of rubber sheathed conduits in a machine of the type known to the art as a "tuber."

In my copending application for United States Letters Patent Serial No. 146,845, filed June 7, 1937, disclosure is made of means to apply a regulated amount of rubber to a conduit, forming thereon a sheath of desired thickness and the means for regulating the thickness of such a sheath are spaced circumferentially around the head from which the sheathing material is extended as the conduit is advanced through the extruding orifice.

In order that the regulating means may be adjusted accurately, it is desirable to ascertain the actual thickness of the sheath as it is being formed and to provide an indication of any disconformity from the proper tubular contour of such a sheath.

So far as known to applicant no diameter-sensing means of conventional character are suitable for the above-stated purpose, as existing devices of the nature of micrometers, calipers or other diameter-sensing mechanisms are designed particularly for application at opposite ends of a diameter of a rigid cylindrical structure, such as a piston, a calendar roll or a rod, in which the indication, however sensitive, is merely that of a variation in diameter and sometimes only of a variation in radius at a single diameter, and these afford but little indication of plural disconformities with accurate location of their position, unless the roll, piston, etc., be rotatable.

Inasmuch as an extruded tube is ordinarily not rotated during extrusion, the devices above mentioned are not available, and under such conditions it is the primary object of the present invention to provide a diameter-measuring which while not confined to diametrical measurements of resilient tubular structures as they are being extruded, will nevertheless be especially useful in accomplishing the measurements thereof for which no mechanism exists at present.

In pursuance of the above general object, a more particular object is to provide a diameter indicator of the class described, with a plurality of abutments adapted to be set in fixed adjusted position for contact at spaced regions with the periphery of the article whose circumference is to be tested; a plurality of movable adjustments adapted to be presented respectively in yielding contact with said periphery at spaced regions oppositely disposed relatively to the fixed abutments, a connecting means for each of said movable abutments and each adapted to be moved independently by movement of its abutment and an indicator to furnish indications of the movements of said connections.

A further object is to provide means by which the movements of said connecting means are integrated in course of transmission to the indicating means, whereby the latter is adapted to furnish an indication of the resultant of the combined movements of said movable abutments, thereby indicating a mean of variation in the dimensions of said cylindrical body at angularly displaced radii.

Still another object of the invention is to provide an auxiliary indicator and connections therefrom to the system of abutments whereby an indication will be furnished of a bodily displacement of the longitudinal axis of the cylindrical body being measured, caused by an increase in length of one or more radii extending toward one or more of the fixed abutments; and as an ancillary object, the provision of means to co-ordinate the last-named indication with the first-named indications by index pointers disposed in conveniently observable juxtaposition upon a common dial.

Another object is to provide for said abutments a common supporting standard constituting a portable unitary structure which can be moved readily to a selected station in convenient proximity to the extrusion head of a tuber, and anchored there in position for advancement of the extruded sheathed conduit through the system of abutments.

Other objects and features of the invention will appear as the description of the particular physical embodiment selected to illustrate the invention progresses.

In the accompanying drawings, like characters of reference have been applied to corresponding parts throughout the several views which make up the drawings, in which:

Fig. 2 is a fragmentary, detail view in vertical section upon an enlarged scale of the head of said instrument;

Fig. 3 is a fragmentary, detail view in transverse vertical section taken on the line 3—3 of Fig. 2;

Fig. 4 is a fragmentary, detail view in sectional elevation of one of the movable abutment devices and its associated parts, taken on the diagonal broken line 4—4 of Fig. 2;

Fig. 7 is an enlarged detailed fragmentary view in side elevation of a portion of the head of the apparatus of Fig. 1, partly in section, showing details of the vernier adjustment of abutments;

Fig. 8 is a plan view, partly in section on the line 8—8 of Fig. 7;

Fig. 9 is a front elevation of a modified construction of instrument, embodying the invention; and Fig. 10 is a section on the line 10—10 of Fig. 9.

Figure 1:
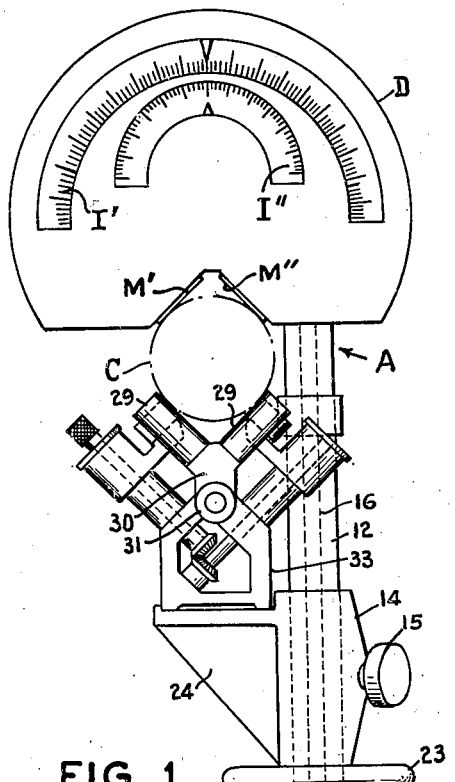
Fig. 1 is a view in front elevation of a diameter measuring instrument in the construction of which the present invention has been embodied.

Referring to the drawings and first to Figs. 1 to 8 inclusive, the part designated generally by the reference character S is a standard by which the several elements of the measuring device are supported portably. The standard includes telescopically assembled members 11, 12 and 13. The member 11 is fixedly mounted on a carriage 17 which may be supported by casters 18, when it may be rolled from place to place. These casters, however, are adapted to be raised from the floor and the carriage held in a fixed position by handscrews 19 mounted in the carriage and adapted, when screwed downwardly, to contact the floor and raise the casters therefrom. When the instrument has been rolled to a desired position on the casters, the casters are lifted from the floor and the carriage held in the position in which the sheathed conduit C is in alignment with, and adapted to be advanced from, the system of abutments designated generally by the reference character A, the instrument being thus readily rolled to a desired position and thence firmly established thereon. Jam-nuts 19x serve to prevent casual displacement of the screws 19.

The member 12 is tubular having a central opening 16 splined within the member 11 by means of a key 16', the tube 12 being thus capable of sliding longitudinally, but not turning, with relation to the member 11.

The abutments may be adjusted vertically by means of a hand wheel 20 having a hub 21 in screw-threaded engagement with the tube 12 and bearing upon the top end of the member 11, the supporting standard 12 and the abutment system carried thereby being adjusted as to height by turning the wheel 20 in one direction or the other.

Surrounding, and in screw-threaded engagement at 22 with the member 12 is a sleeve 13 having the slit sleeve 14 at its upper end, such slit sleeve having a tendency to spring away from the tube 12 so that it may have movement with relation thereto, but the sides of the sleeve may be drawn together by a screw 15 to cause the sleeve 14 to grip the tube 12 to clamp it in position.

The sleeve 13 is provided with a hand-wheel 23 by means of which the sleeve 13 may be turned or held stationary with relation to the tubular standard 12. The sleeve 14 is provided with a supporting bracket 24.

At the upper portion of the standard, and slidably mounted thereon, is a split sleeve 25 which may be drawn together to clamp it in fixed position upon the standard 12, or may be loosened to permit relative movement with relation to the standard 12, by means of a screw 26. This sleeve 25 carries the movable abutments M' and M" and the dial D with index scales I' and I". The sleeve 25 and its carried parts can be adjusted vertically by means of the hand wheel 20, as before referred to, but is provided with a nicer or vernier adjustment as follows:

The top of the tubular standard 12 is provided with a lateral flange 90 within which is rotatably mounted the member 91 which, at its lower end 92, is in screw-threaded engagement with the walls of a bore 93 in the sleeve 25. The screw member 91 has at its upper end the knurled finger wheel 94 for turning it. The screw member 91 is provided with a circumferential groove 95 within which fit the edges of a plate 96, such edges being about the recess 97 in the plate, and this plate 96 is fixedly secured to the end of the tubular standard 12 by means of a screw 98 passing through the plate and in screw-threaded engagement with the interior of the member 12.

It will now be apparent that by turning the screw member 91 in one direction or the other that the sleeve 25 will be moved (when the screw 26 is loosened) upwardly or downwardly according to the direction of turning of the screw member 91, and that the movement of the sleeve 25 will be very gradual so that a very fine vernier adjustment is secured. When adjusted to its desired position, the sleeve 25 may be secured in such position by tightening the screw 26.

In order to prevent the adjustment thus effected from being accidentally disarranged or tampered with, a means for sealing the adjustment is provided by means of a metal strip 99 secured in a fixed and not readily removable manner to the tubular standard 12 by means of a rivet 100 or a suitably locked screw. This strip 99 extends into a recess or slot 101 in the sleeve 25, the strip sliding in the slot as the sleeve 25 is adjusted as described. When the desired adjustment has been reached, a sealing metal, such as lead, 102 is poured through the hole in the strip 99 and into recess 103 in the sleeve 25, a head being formed by the lead outside of the strip as shown. The lead having hardened, it will be seen that the sleeve 25 will be sealed against relative movement on the tubular standard 12, and that such movement can only be again effected by breaking the seal (removing the lead) whereby the sleeve 25 again becomes movable with relation to the tube 12. The collar 27 is fixed to the sleeve 12 by a dowel pin 28.

The sleeve 14 has a bracket 24 carrying a frame 33 from which extends the rod 32 fitted at its outer end with a co-axially adjustable fixture 31 from which extends upwardly a fork 30, the arms of which are provided with anti-friction rollers 29. The rollers as indicated in Fig. 1 serve as guides for the sheathed conduit or hose C as it advances from the extrusion orifice of the tuber (not shown). Jam-nuts 28 hold the rod 32 in its adjusted position.

While the fork rollers 29 just describe serve adequately as guides, it should be understood that the sheathed conduit C is of considerable weight, more or less unwieldy, and at this region of its length, having just been extruded, has not attained its final condition of solidity, so that for all of the above reasons it is eminently desirable that its support during the measuring operation should be firm, frictionless and accurately aligned.

The invention provides for this purpose abutments A' and A" adapted to afford a rolling support to the advancing sheathed conduit, the rolls thus provided being carried by studs 35 extending divergently from brackets 36 on heads 37 slidingly adjustable on hollow posts 38 set on, and preferably formed integrally with, the frame 33. The posts 38 include bearings 39 for threaded adjusting screw shafts 40 and 41 which are connected together by bevel gears 42, 43 and one of the shafts, as 40, may desirably have a suitable means, as the knurled head 44, by which it may be readily turned for purposes of adjustment, such rotation resulting in a complemental rotation of 41.

The screw shafts are thus screwed through blocks as 45 formed as parts of the heads 37, each block having a part 45 secured thereto by screws 47, and a face plate 48 secured to the head 37 by the screws 47, serves as an index means to indicate the basic diameter of C.

When the abutments A' and A" have been adjusted in the manner just described according to the diameter of the sheath to be tested, they preferably remain in this basic position for all conduits of the same diameter or similar diameter within a given range, and it may be observed that preferably the rolls A' and A" will occupy respectively positions of adjustment tangent to the conduit sheath C at a point diametrically opposite to the point of tangency occupied by the correspondingly opposed roll M' or M", as the case may be, of the movable abutments which will now be described.

Figure 5:
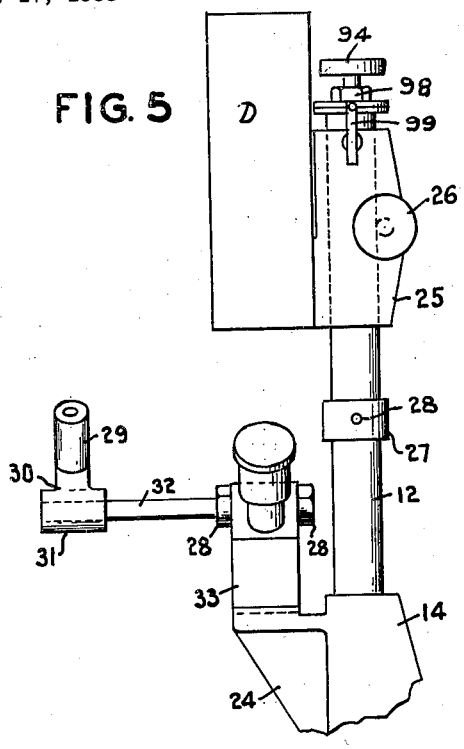
Fig. 5 is a fragmentary, detail view in side elevation of the head of the instrument, broken from right to left of Fig. 2.
Figure 6:
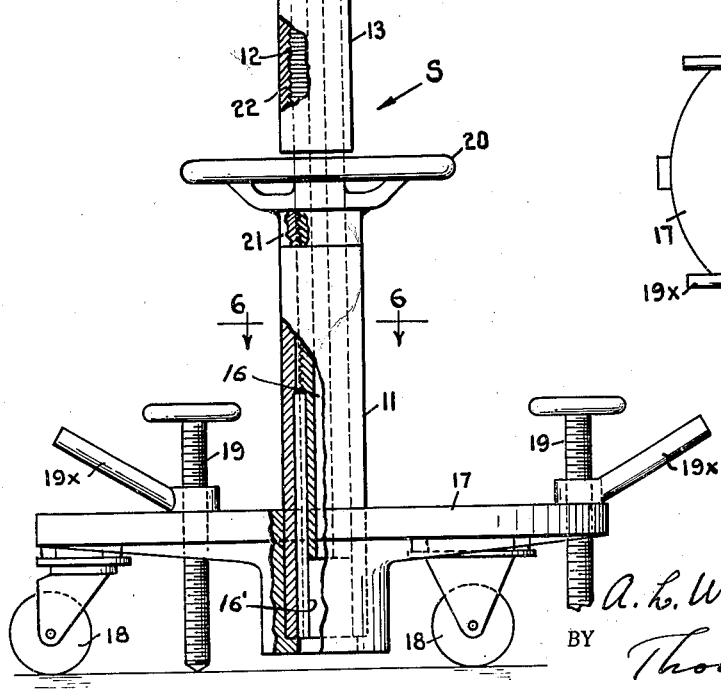
Fig. 6 is a view in horizontal section on the line 6—6 of Fig. 1, upon a reduced scale.

Each of the rolls as M' (see Fig. 4) is journaled in a pair of brackets 51 carried by a plate 50 mounted pivotally at 49 on a base 52 secured to an apron 53 which is provided on the sleeve 25 shown in Fig. 5, and constitutes the main support for the structure included in the head H. As shown in Fig. 4 the angular position of the plates 50 can be controlled by the calibrating screws 54, which serve as means to set the rolls M' and M" respectively to the correct initial positions of tangency against the conduit sheath C being tested, and at the same time sets the pointers P' and P" at their respective zero points on the index scales I' and I".

The journal posts 55 of each roll, as M', are mounted in arms of a yoke, as Y' and Y", from each of which a connecting rod, as 56 and 57, runs to a shackle, as 59, (see Fig. 4), which embraces the flanges of a trough-shaped lever, as L', L", each of these levers being pivoted at 60 to an upright 61, bolted at 62 to the plate 53, the connecting rods 56 and 57 extending respectively, each through an orifice 63 in the bottom of its trough-shaped lever, and having a connection with the short arm 64 by means of a ball 65, (see Fig. 4) which is embraced between the cupped ends of screws 66 which are locked by nuts 67 in a position which permits easy play of the connection. The effective length of each rod 56, 57, may be adjusted, as by lock nuts 68 and 69.

At the free end of each of the levers L' and L", which are symmetrically disposed relatively to each other, is a rivet and hanger connection 70, 71, with a connector 72, 73, constituting terminals of a flexible member 74, preferably a chain, which is coiled upon a barrel 75 (see Fig. 3), having an axial shaft 76 to which is affixed the pointer P". Accordingly, the shaft 76 is supported by the chain, and its ends project into slots 77 formed in upright plates 78 and 79 forming part of the head structure.

A yoke 80 is connected with the ends of the shaft 76, and another chain 81, connected with the hook-shaped yoke 80, is wound helically around a barrel 82 and its free end is secured to a coil spring 83 (see Fig. 2) attached at 84 to the frame member 85.

The barrel 82 has a shaft 86 journaled in the members 78, 79, and 85 of the frame, and to the rear end of this shaft is affixed the shank 87 of the pointer P'.

In the operation of the mechanism, if a sheathed conduit be extended into the position of the conduit C, as shown in Fig. 2, resting on the rolls A' and A", and with the free abutments M' and M" substantially in the positions illustrated in that figure, the abutment system will remain with its fixed abutment members A' and A" and its movable abutment members M' and M" in their illustrated relative positions. If, however, as the hose is moved longitudinally through the device, the sheathing shall be thicker on one side of the cross section than on the other, then the rollers M' and M" will be either or both of them moved accordingly and the difference on the two sides will be indicated by the position of the pointer P" with reference to the central or neutral positions, and the side of that position upon which the pointer is moved will indicate the side of the hose which is thicker. Not only is it desired to indicate the relative thickness of the two sides of the hose, but it is desired to indicate the mean thickness at any particular cross section of the hose, and this is occasioned by noting the average positions of the rollers M' and M". Such average movement may be stated in another way to be the shifting radially of the axis of the tube, and this is indicated by the pointer P' on one side or the other of its central or neutral position, which may be noted on its adjacent scale. The shifting of the tube axis in one direction being indicated by the position of the pointer on one side of the neutral position and the shifting of the axis in the other direction being noted by the position of the pointer on the other side of the neutral position. This mean value gives an index of the body of the hose passing through the instrument while the pointer P" indicates the variation side to side of the body.

Referring to Figs. 9 and 10, the apparatus therein shown is better adapted for portability than that heretofore referred to and comprises a flat bar 103 of rectangular cross section has sliding upon it a carriage 104 which may be secured in any adjusted position by means of a set screw 105. Fixed to one end of the bar 103 is a head 106 having recesses in which rollers 107 and 108 are journaled on axes at angles with each other. The carriage comprises a plate 109 on the back of which are mounted two longitudinally slidable plungers 110 and 111 arranged at an angle to each other and each having a fork 112 at one end and a head 113 at the other end, rollers 114 and 115, with their axes at an angle, being journaled respectively in the forks of the plungers 110 and 111.

Having one end secured to the head on the plunger 110 is a cord or band 116 which, after passing about the idler pulley 117, has its other end secured to one end of the lever or whiffletree 118. Similarly a cord 119 has one end secured to the head of the plunger 111 and, after passing about the idler pulley 120, has its other end secured to the end of the whiffletree opposite to that at which the cord 116 is secured. At an intermediate point the whiffletree or lever 118 is pivoted in the clevis 121 secured to one end of the cord or band 122 which is given one or more turns about the rotary barrel 123 and passes on to have its end secured to one end of the tension spring 124, the other end of such spring being secured to a stationary anchorage 126 on the plate 109.

The barrel 123 is fixed on the rotatable pivot 126 which extends through the plate 109 and has fixed to it at the front of the plate the indicating pointer or needle 127 moving over the scale 128 on the front of the plate.

To press the carriage and bar 103' firmly together at all times, a comparatively stiff spring 129 is fixed to an extension plate or bar 130 extending from the carriage and passes around and bears against the opposite side of the flat bar 103.

In the use of the apparatus, the carriage is slid along the bar 103 so as to permit the article to be measured, such as a rubber sheathed hose C, to be placed in position against the rolls 107 and 108 as indicated in Fig. 9. The carriage is then slid toward the hose until the rollers 114 and 115 will occupy the position of a normally-shaped and normally-sized hose. The hose is then relatively moved endwise through the rollers either by moving the rollers and connected apparatus with relation to the hose, or the hose with relation to the rollers, or both.

Should the diameter under the roller 114 vary, the plunger 110 will slide accordingly and the cord or belt 116 will be pulled on or slackened so that the end of the whiffletree to which the cord is connected will be either drawn to the left or permitted to move to the right under the influence of the spring 124. Similarly the increased or lessening of the diameter of the hose under the roller 115 will cause a corresponding sliding of the plunger 111 and a corresponding movement of the end of the whiffletree 118 to which the cord or belt 119 is connected.

It will be seen that the movement of the indicator 127 will be dependent upon the movement of the translation of the clevis 121 and that the movement of this clevis is jointly dependent upon the movements of the plungers 110 and 111 brought about by the movement of the rollers 114 and 115 as the diameters of the hose under such rollers respectively are increased or decreased. The movement of the clevis therefore will be an indication of the mean variation of the hose diameters and accordingly the needle 127 will indicate, by its position on the scale 128, the mean variation of the diameters of the hose, the instrument being ordinarily set so that with no variation from the normal turning the needle will stand on zero.

While the invention has been illustrated in what are considered its best applications it may have other embodiments without departing from its spirit and are not therefore limited to the structures shown in the drawings.

What I claim is:

1. A measuring instrument of the class described, said instrument comprising a support, a plurality of fixed abutments mounted in said support in position to be engaged with circumferentially spaced regions of the periphery of an elongated cylindrical structure as the latter is advanced past said support, a plurality of movable abutments mounted on said support in positions to be engaged with circumferentially spaced regions of the periphery of said cylindrical structure opposed to said first-named contact regions, means operatively related to said movable abutments to bias said movable abutments yieldingly toward said cylindrical member and means operatively related to said movable abutments to furnish suitable indications of the movements of said movable abutments.

2. A measuring instrument of the class described, said instrument comprising a support, a plurality of abutments adapted to be set in fixed adjusted position on said support for contact at spaced regions with the periphery of an article whose circumference is to be tested, a plurality of movable abutments adapted to be presented respectively in yielding contact with said periphery at spaced regions oppositely disposed relatively to the fixed abutments, an indicator, a plurality of connecting means for said indicator adapted each to be moved independently by a movement of one of said movable abutments caused by a variation in the diameter of said article and means operatively relating said connecting means to translate movements derived from at least two of said movable abutments into an integrated resultant movement of said indicator.

3. A portable measuring instrument of the class described, said instrument comprising a supporting standard, a plurality of abutments adapted to be set in fixed adjusted position on said standard for contact at spaced regions with the periphery of an article whose circumference is to be tested, a plurality of movable abutments adapted to be presented respectively in yielding contact with said periphery at spaced regions oppositely disposed relatively to the fixed abutments, an indicator, connections for said indicator from each movable abutment adapted to communicate to said indicator movements of said movable abutments caused by variations in the diameter of said article, and a carriage supporting the aforesaid apparatus provided with castors upon which said standard can be rolled to a desired station for measurement of said article and self-contained means to anchor said carriage at said station.

4. A portable measuring instrument of the class described, said measuring instrument having the features claimed in claim 2, including carriage comprising a standard including a plurality of members telescopically adjustable to vary the height at which said assembly of abutments is supported and to vary the relative rotative positions of said telescopic members selectively, means to maintain said selected rotative position of said abutments with relation to said standard and means to secure said telescopic members against relative telescopic movement to maintain their selected telescopic position.

5. A measuring instrument having the features claimed in claim 1 in which said support comprises a telescopic standard provided with a bracket mounted thereon carrying said adjustably fixed abutments and a head carrying said movable abutments, said bracket and head being adjustable rotatively on said standard and as to height relatively to, and independently of, each other and means to maintain the respective adjustments of the head and bracket.

6. A measuring instrument having the features claimed in claim 1 including a frame upon which said adjustable fixed abutments are assembled, said frame having posts disposed divergently at a predetermined angle relatively to each other, threaded blocks movable co-axially upon said posts and threaded shafts connected by bevel gears for complemental rotation of the shafts to effect symmetrical displacement of said abutments to predetermined fixed points along said divergent axes.

7. A measuring instrument having the features claimed in claim 1 including a frame upon which said adjustable fixed abutments are assembled, said frame having posts disposed divergently at a predetermined angle relatively to each other, threaded blocks movable co-axially upon said posts and threaded shafts connected by bevel gears for complemental rotation of the shafts to effect symmetrical displacement on said abutments to predetermined fixed points along said divergent axes and means to permit ready actuation of at least one of said shafts manually, to effect the desired symmetrical adjustments of said last-named abutments.

8. A measuring instrument having the features claimed in claim 1 including a frame upon which said adjustable fixed abutments are assembled, said frame having posts disposed divergently at a predetermined angle relatively to each other, threaded blocks movable co-axially upon said posts and threaded shafts connected by bevel gears for complemental rotation of the shafts to effect symmetrical displacement on said abutments to predetermined fixed points along said divergent axes, means to permit ready actuation of at least one of said shafts manually, to effect the desired symmetrical adjustments of said last-named abutments and means to indicate the extent of fixed displacement of said last-named abutments.

9. A measuring instrument having the features claimed in claim 1 in which said movable abutments include at least a pair of rollers each journalled to rotate freely about an axis transversely disposed relatively to the axis of lengthwise advancement of said cylindrical article to be tested, a carrier for each roller and means to bias each carrier yieldingly toward said article along the radius intersecting the point of tangency between the roller and article.

10. A measuring instrument having the features claimed in claim 1 in which said movable abutments include at least a pair of rollers each journalled to rotate freely about an axis transversely disposed relatively to the axis of lengthwise advancement of said cylindrical article to be tested, a carrier for each roller and means to bias each carrier yieldingly toward said article along the radius intersecting the point of tangency between the roller and article, each of said carriers having a rocker with side plates in which said abutment roller is journalled and a base on which said rocker is pivoted.

11. A measuring instrument having the features claimed in claim 1 in which said movable abutments include at least a pair of rollers each journalled to rotate freely about an axis transversely disposed relatively to the axis of lengthwise advancement of said cylindrical article to be tested, a carrier for each roller and means to bias each carrier yieldingly toward said article along the radius intersecting the point of tangency between the roller and article, each of said carriers having a rocker with side plates in which said abutment roller is journalled and a base on which said rocker is pivoted with a spring device adjustable to calibrate said rocker and roller in a normal position of tangency with respect to the mean diameter of the article to be tested.

12. A measuring instrument having the features claimed in claim 1 in which said movable abutments include at least a pair of rollers each journalled to rotate freely about an axis transversely disposed relatively to the axis of lengthwise advancement of said cylindrical article to be tested, a carrier for each roller and means to bias each carrier yieldingly toward said article along the radius intersecting the point of tangency between the roller and article and in which connecting means are provided for each such movable abutment to said indicating means.

13. A measuring instrument having the features claimed in claim 1 in which said movable abutments include at least a pair of rollers each journalled to rotate freely about an axis transversely disposed relatively to the axis of lengthwise advancement of said cylindrical article to be tested, a carrier for each roller and means to bias each carrier yieldingly toward said article along the radius intersecting the point of tangency between the roller and article and in which connecting means are provided for each such movable abutment to said indicating means, each connecting means comprising a rod extending in a substantially radial direction from said roller, a lever mounted upon the support and having a short arm with which said rod is connected pivotally and having a longer arm with flexible operating means running to said indicator.

14. A measuring instrument including an oscillating indicator pointer having a suitable supporting structure, a shaft journalled in bearings upon said supporting structure; said instrument comprising a pair of movable abutments adapted to be engaged with circumferentially spaced regions of the periphery of a cylindrical article to be tested, connecting means comprising a lever for, and responsive to movements of, each abutment, a barrel on said shaft, and a flexible member wound upon said barrel and having each end secured to an arm of one of said levers.

15. A measuring instrument having the features claimed in claim 14 in which said flexible member acts as an integrator for transmitting to said pointer a rotative movement which is the resultant of the movements communicated to said flexible member by said levers according to the extent of disconformity of the periphery of said article from its normal contour.

16. A measuring instrument having the features claimed in claim 14 in which said flexible member acts as an integrator for transmitting to said pointer a rotative movement which is the resultant of the movements communicated to said flexible member by said levers according to the extent of disconformity of the periphery of said article from its normal contour, said rotative movement being excited upon the pointer in clockwise or counterclockwise direction accordingly as the movement communicated by one or the other lever to said flexible member dominates in the integration of said resultant.

17. A measuring instrument having the features claimed in claim 14 in which said flexible member acts as an integrator for transmitting to said pointer a rotative movement which is the resultant of the movements communicated to said flexible member by said levers according to the extent of disconformity of the periphery of said article from its normal contour, said shaft having its ends journalled slidingly in slotted bearings, a yoke connected with said shaft-ends, and a second flexible member wound upon a second barrel having a second shaft rotatable in fixed bearings in the supporting structure, said second flexible member having one of its ends connected with said yoke and having its other end connected with a coil spring affixed to said support, and a second pointer fixed upon said second shaft, whereby said second pointer is made responsive to rotative movements of said second shaft caused by movements of said first shaft in its bearing slots.

18. A measuring instrument having the features claimed in claim 14 in which said flexible member acts as an integrator for transmitting to said pointer a rotative movement which is the resultant of the movements communicated to said flexible member by said levers according to the extent of disconformity of the periphery of said article from its normal contour, said shaft having its ends journalled slidingly in slotted bearings, a yoke connected with said shaft ends, and a second flexible member wound upon a second barrel having a second shaft rotatable in fixed bearings in the supporting structure, said second flexible member having one of its ends connected with said yoke and having its other end connected with a coil spring affixed to said support, and a second pointer fixed upon said second shaft, whereby said second pointer is made responsive to rotative movements of said second shaft caused by movements of said first shaft in its bearing slots, said second shaft being thereby adapted to cause said pointer to indicate the extent of bodily displacement of the axis of said article being measured by an increased radius in the direction of one of the fixed abutments.

19. A measuring instrument having means adapted to sense variations in diameter of a rubber-sheathed tube passed through said instrument, said instrument including a support, a plurality of abutments fixed to said support and adapted to support said tube at a plurality of circumferentially spaced peripheral regions, and a plurality of abutments movably mounted on said support and adapted to contact yieldingly with said sheath at regions thereof opposed to the fixed abutments, indicating means, and means controlled by variations in the average distance between said movable abutments collectively and said fixed abutments collectively for controlling said indicating means whereby to indicate the average variations in thickness of said tube.

20. In a measuring instrument of the class described, a head comprising an upright plate having its lower margin formed with an inverted V-shaped notch to permit a cylindrical body to be presented in said notch transversely to said plate a pair of abutment devices each of which comprises a roller journalled on a rocker with its axis of rotation parallel to a side wall of said V-shaped notch, a pair of uprights extending upwardly beyond the upper edge of said plate, a pair of levers, one pivoted on each of said uprights above the level of said notch, a pair of shafts in a spaced vertical alignment in a plane bisecting said notch, a pair of pointers mounted each on one of said shafts and adapted to oscillate to either side of said plane and a pair of arcuate index scales complemented to said pointers and a casing enclosing said abutments and levers and carrying on its face said index scales, said head constituting a unitary structure assembled as an entity with said instrument.

21. In a measuring instrument of the class described, a standard, a bracket mounted in vertically and rotatably adjustable positions upon said standard, a frame on said bracket, a pair of abutments adapted to be fixed in adjusted divergent positions on said frame and a rod fixed in adjusted horizontal disposition on said frame having a crotch fitted thereon at an adjusted distance horizontally from said abutments.

22. A measuring instrument having the features claimed in claim 21, in which a head is mounted above said bracket on said standard, and carries a pair of movable abutments in opposition to said fixed abutments whereby an elongated cylindrical body traversing said assembly of abutments will be aligned by said crotch in proper disposition to insure registry of said abutments with a true circumference of said cylindrical body.

23. A measuring instrument of the class described, comprising a standard adapted to be rolled toward and away from, and to receive a tube from, the extrusion head of a tuber, said standard having an adjustable bracket and an adjustable head provided respectively with fixed abutments and movable abutments adapted to cooperate for the measurement of the thickness of a tube with a rubber sheath extruded from said head at successive regions as said sheath is advanced, indicating means to indicate concurrently with said advancement, variations in the thickness of said sheath and means controlled by said abutments for operating said indicating means.

ARCHIBALD L. WALLACE.